United States Patent
Lee et al.

(10) Patent No.: US 11,900,315 B2
(45) Date of Patent: Feb. 13, 2024

(54) OBJECT STORING AND FINDING METHOD AND SYSTEM INTEGRATING HUMAN SENSOR INTO LAMP

(71) Applicants: GENERAL LUMINAIRE (SHANGHAI) CO., LTD., Shanghai (CN); GENERAL LUMINAIRE (KUNSHAN) CO., LTD., Kunshan (CN); GENERAL LUMINAIRE CO., LTD., New Taipei (TW)

(72) Inventors: Chien Lee, Shanghai (CN); Yung-Hong Wang, Shanghai (CN)

( * ) Notice: Subject to any disclaimer, the term of this patent is extended or adjusted under 35 U.S.C. 154(b) by 263 days.

(21) Appl. No.: 17/582,002

(22) Filed: Jan. 24, 2022

(65) Prior Publication Data

US 2023/0259876 A1     Aug. 17, 2023

(51) Int. Cl.
| | |
|---|---|
| G06Q 10/087 | (2023.01) |
| H04W 4/029 | (2018.01) |
| G01J 5/00 | (2022.01) |
| G06K 19/06 | (2006.01) |

(52) U.S. Cl.
CPC .......... *G06Q 10/087* (2013.01); *G01J 5/0025* (2013.01); *G06K 19/06037* (2013.01); *H04W 4/029* (2018.02)

(58) Field of Classification Search
CPC ........ G06Q 10/087; G01J 5/0025; G01J 5/34; G06K 19/06037; H04W 4/029
See application file for complete search history.

(56) References Cited

U.S. PATENT DOCUMENTS

| | | | |
|---|---|---|---|
| 9,451,674 B1* | 9/2016 | Kong ................... | H05B 47/155 |
| 10,685,326 B1* | 6/2020 | Ewing ................ | G06Q 10/0875 |
| 2015/0076993 A1* | 3/2015 | Mohan .................... | H05B 47/11 |
| | | | 315/153 |
| 2020/0142021 A1* | 5/2020 | Riley ...................... | G01S 1/0426 |
| 2020/0311845 A1* | 10/2020 | Steketee .............. | G06Q 10/087 |
| 2022/0180302 A1* | 6/2022 | Siragusa ............ | G06Q 30/0601 |

\* cited by examiner

*Primary Examiner* — A. Hunter Wilder

(57) ABSTRACT

An object storing and finding method and system integrating human sensor into lamp and working together with mobile device to perform object storing and finding operations of storage object in storage environment includes an object storing procedure that sets an identification code for the storage object, installs a human sensor to each lamp, and sets up Beacon host systems in the storage environment, and after detected by the human sensor, the Beacon host systems are triggered to send out coordinate value of the lamp located at position of the storage object and integrate coordinate value with the identification code to complete object storing operation; and an object finding procedure that inputs the identification code of the storage object by the mobile device and obtains the corresponding coordinate value, such that the corresponding lamp shows luminous change provided for user to visually observe and determine the position of the storage object.

16 Claims, 3 Drawing Sheets

OBJECT STORING AND FINDING METHOD AND SYSTEM INTEGRATING HUMAN SENSOR INTO LAMP

BACKGROUND

Technical Field

The present disclosure relates to the field of warehouses, and more particularly to an object storing and finding method integrating a human sensor into a lamp and working together with a mobile device to perform object storing and finding operations of at least one storage object in a storage environment.

Description of Related Art

The concept of warehouse is to store objects in an orderly manner and retrieve the objects when needed in the future. In experience, most of the objects are stored in indoor warehouses to avoid damages to the objects caused by sunshine and rain. In addition to small-size goods, the type of objects stored in the warehouses also include various types of large-size goods such as various manufacturing machines, large electric appliances, etc. Since most warehouse spaces are very large, it is impossible to see the entire area at a glance, and the number of storage objects of similar specifications or even the same specifications may be quite large or even up to tens of thousands, so that it is very inconvenient to retrieve a specific storage object, especially the aforementioned large object, which greatly increases the difficulty of retrieving the object. In addition, many lamps are often installed in an indoor warehouse place and uniformly distributed according to the spatial allocation of the warehouse to provide sufficient lighting in each area of the warehouse. Therefore, it is necessary to set up enough uniformly distributed lighting lamps in the indoor area of the warehouse.

In view of the aforementioned problems, the discloser of the present disclosure based on years of experience in the related industry to conduct extensive research and experiment and use the existing properties of the installed lamps of the indoor warehouse as a "finding indicator" of the physical objects, and finally provided an object storing and finding method integrating a human sensor into a lamp and system, in order to provide more diversified functions to the existing lamps in the indoor warehouse areas and overcome the inconvenience of finding and retrieving objects in a large warehouse by a novel method completely different from the conventional method.

SUMMARY

In view of the problems of the prior art, it is a primary objective of the present disclosure to provide a method and system for storing larger objects such as molds and similar objects in a factory warehouse and quickly locating the object storage position in the future.

To achieve the foregoing and other objectives, the present disclosure provides an object storing and finding method integrating a human sensor into a lamp and working together with a mobile device to perform object storing and finding operations of at least one storage object in a storage environment, wherein the storage environment has a plurality of lamps, characterized in that the object storing and finding method includes: an object storing procedure that sets an identification code which is a QR code on the storage object, installs a human sensor to each of the lamps, and sets up a plurality of Beacon host systems in the storage environment to create a coordinate parameter table in the storage environment, wherein when a user puts the storage object in a storage position of the storage environment, the human sensor of the lamp corresponding to the storage position will automatically detect the user to trigger the Beacon host systems to send out a coordinate value the lamp corresponding to the storage position in the coordinate parameter table to be received and recorded by the mobile device, and the mobile device scans and records the identification code and further combines the identification code with the coordinate value to complete the object storing operation; and an object finding procedure that uses the mobile device to input the identification code of the storage object and then obtains the corresponding coordinate value, such that the lamp corresponding to the storage position of the storage object shows a luminous change for instructing the user to visually observe and determine the position of the storage object.

In the aforementioned embodiment, the luminous change is a blinking expression or a color temperature change expression.

In the aforementioned embodiment, if there are two or more lamps simultaneously triggering the human sensors to send out two or more coordinate values, the signal with the strongest intensity will be determined as the lamp where the mobile device is located.

In the aforementioned embodiment, the identification code and the coordinate value are stored in the mobile device or cloud.

In the aforementioned embodiment, the human sensor is a pyro-electric infrared (PIR) detector or a microwave sensor.

In summation of the description above, the object storing and finding method and system of the present disclosure can store large-size objects in a factory area for storage, and quickly provide the specific position of the storage objects for future inquiry to facilitate the retrieval operation of the storage objects, so as to improve the warehouse access efficiency.

DESCRIPTION OF THE EMBODIMENTS

This disclosure will now be described in more detail with reference to the accompanying drawings that show various embodiments of this disclosure.

Figure 1:
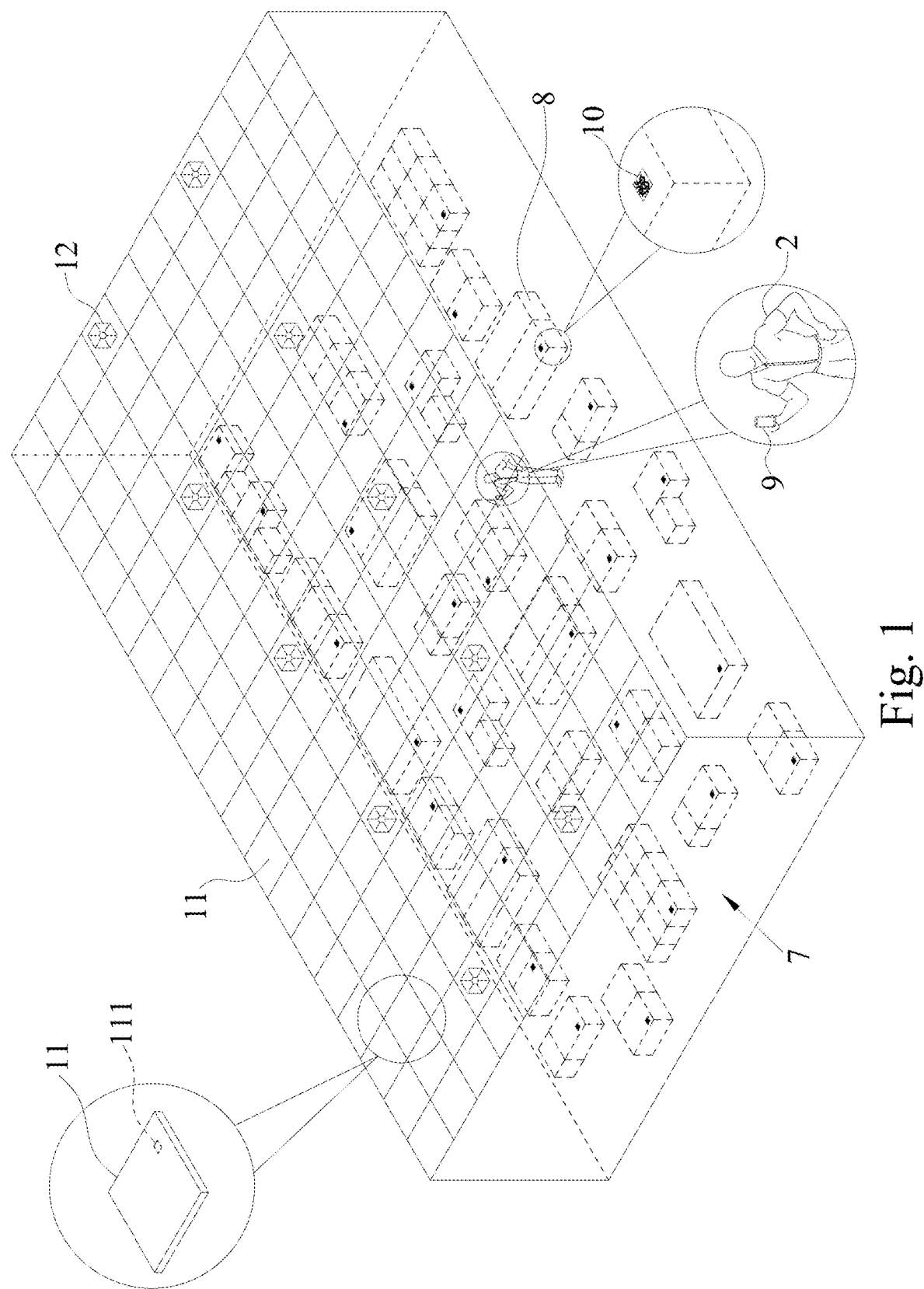
FIG. 1 is a schematic view showing an application of an object storing and finding system in accordance with a preferred embodiment of the present disclosure.

With reference to FIG. 1 for a schematic view showing an application of an object storing and finding system in accordance with a preferred embodiment of the present disclosure, the application environment and the mode of each component shown in the figure are provided for the purpose of illustrating the technical characteristics of the present disclosure only, but not intended for limiting the scope of the present disclosure. The present disclosure provides an object storing and finding system integrating a human sensor into a lamp and working together with a mobile device 9 to perform object storing and finding operations of at least one storage object 8 in a storage environment 7, and the system includes at least one identification code 10, a plurality of lamps 11 and a plurality of Beacon host systems 12.

The identification code 10 is installed and attached to the storage object 8. Preferably, the storage object 8 is a large-size electric appliance, a large-size manufacturing machine, molds, etc. The lamps 11 is installed in the storage environment 7, and a human sensor 111 is installed to each lamp 11. The Beacon host systems 12 is installed in the storage environment 7 and provided for creating a coordinate parameter table of the lamps 11 in the storage environment 7. When a user 2 puts the storage object 8 in a storage position in the storage environment 7, the human sensor 111 of the lamp 11 corresponding to the storage position will automatically detect the user 2 to trigger the Beacon host systems 12 to send out a coordinate value of the lamp 11 corresponding to the storage position in the coordinate parameter table to the mobile device 9, which is received and stored, and the mobile device 9 scans and records the identification code 10 and further combines the identification code 10 with the coordinate value, so as to complete the object storing operation. After the mobile device 9 inputs the identification code 10 of the storage object 8 and obtains the corresponding coordinate value, the lamp 11 corresponding to the storage position of the storage object 8 shows a luminous change provided for instructing the user to visually observe and determine the position of the storage object 8, so as to complete the object finding operation.

The object storing and finding system uses the identification code 10 and the coordinate value of the lamp 11 corresponding to the storage position A as a basis of storing the objects, so as to quickly, simply and easily create accurate storage position information. Therefore, when the user 2 need to find an object, the user simply needs to input the identification code 10 of the storage object 8 by the mobile device 9, such that the corresponding lamp 11 forms a luminous change to visually inform the user 2 about the position of the storage object 8 to achieve the effect of using the lamp 11 as the "finding indicator" of the physical object. It is noteworthy that if the storage object 8 applying the object storing and finding system is a large-size machine, mold, etc., the object storing and finding system can effectively use the linkage between the lamps 11 and the Beacon host systems 12 to assist the user to accurately record the storage position of each storage object 8 and facilitate the future object finding operation.

Figure 2:
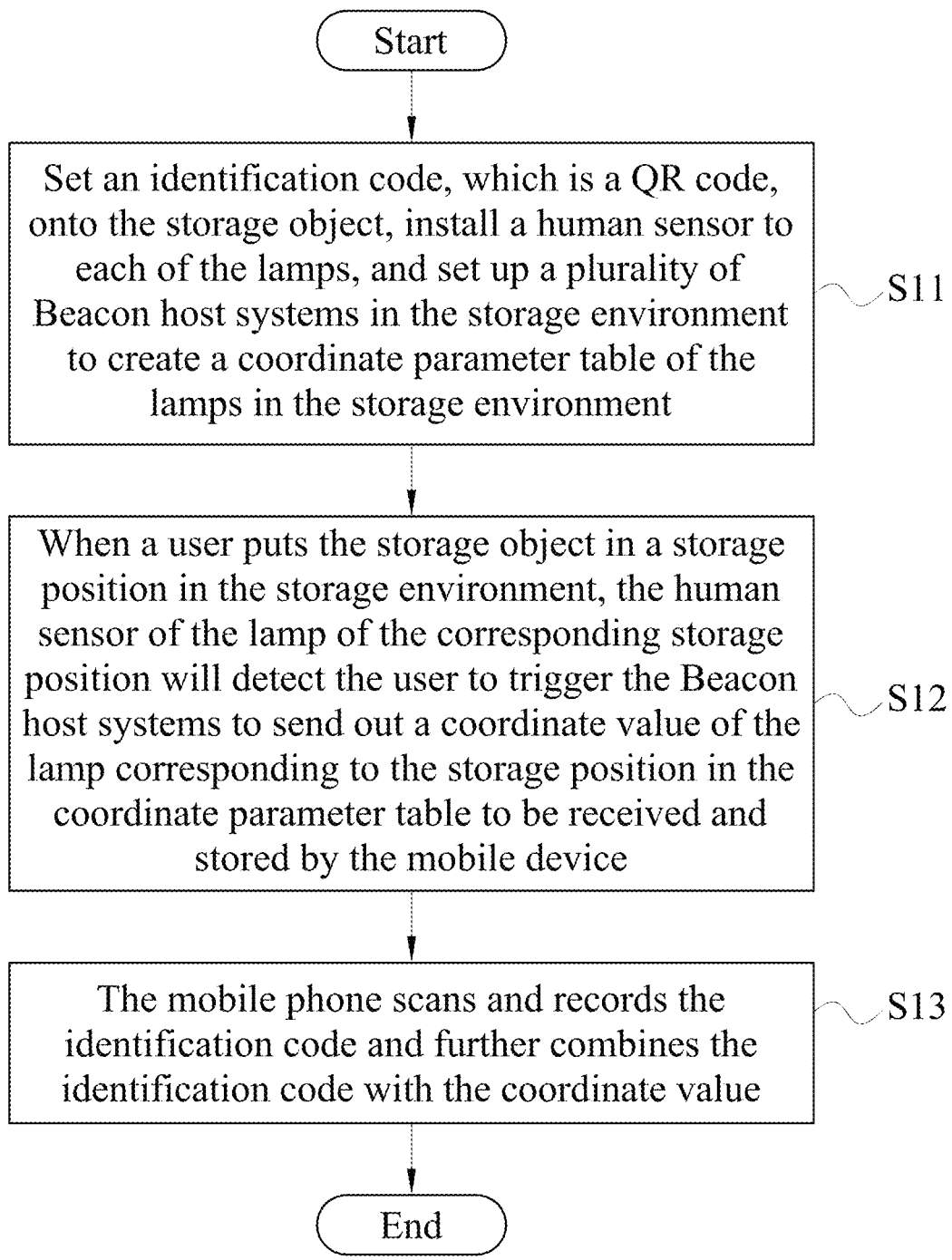
FIG. 2 is a flow chart showing the object storing procedure of an object storing and finding method in accordance with a preferred embodiment of the present disclosure.
Figure 3:
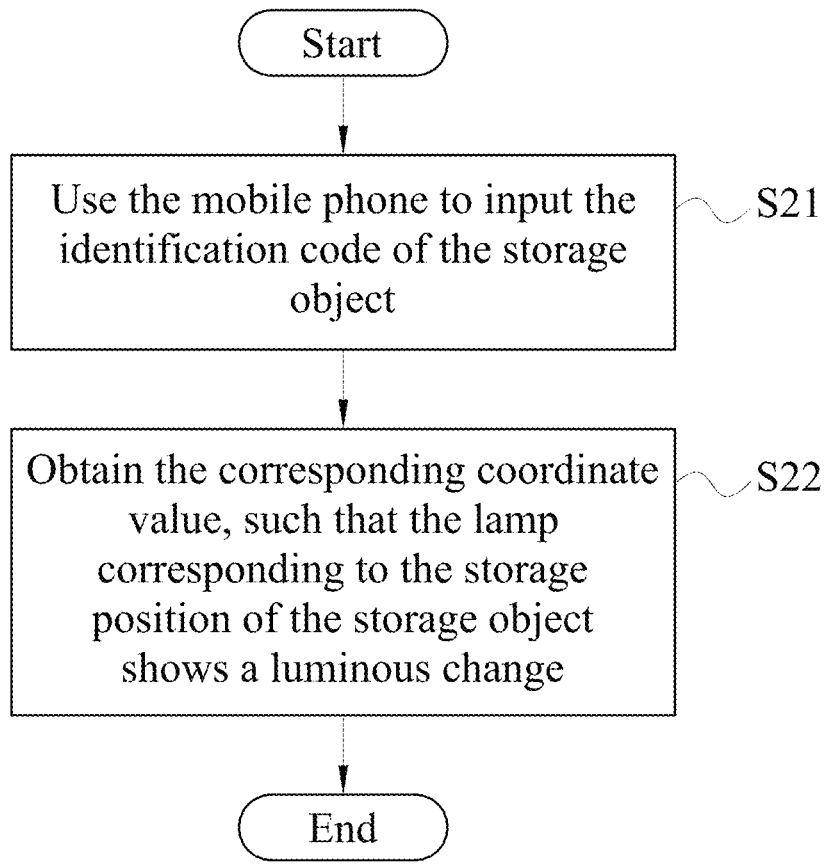
FIG. 3 is a flow chart showing the object finding procedure of an object storing and finding method in accordance with a preferred embodiment of the present disclosure.

With reference to FIGS. 2 and 3 as well as FIG. 1, FIGS. 2 and 3 are the flow charts of an object storing procedure and an object finding procedure of an object storing and finding method in accordance with a preferred embodiment of the present disclosure respectively. Based on the same technical concept, the present disclosure also provides an object storing and finding method integrating a human sensor into a lamp and working together with a mobile device 9 to perform object storing and finding operations of at least one storage object 8 in a storage environment 7, wherein the storage environment 7 has a plurality of lamps 11. The object storing and finding method includes an object storing procedure that sets an identification code 10 which is a QR code for the storage object 8, and installs a human sensor 111 to each of the lamps 11, and sets up a plurality of Beacon host systems 12 in the storage environment 7 to create a coordinate parameter table of the lamps 11 in the storage environment 7 (Step S11). When a user 2 puts the storage object 8 in a storage position in the storage environment 7, the human sensor 111 of the lamp 11 of the corresponding storage position detects the user 2 to trigger the Beacon host systems 12 to send out a coordinate value of the lamp 11 corresponding to the storage position in the coordinate parameter table to be received and stored by the mobile device 9 (Step S12), and the mobile device 9 scans and records the identification code 10 and further combines the identification code 10 with the coordinate value (Step S13) to complete the object storing operation.

In the object finding procedure, the mobile device 9 is used to input the identification code 10 of the storage object 8 (Step S21) and then obtain the corresponding coordinate value, such that the lamp 11 corresponding to the storage position of the storage object 8 shows a luminous change (Step 22), and the luminous change is provided for instructing the user 2 to visually observe and determine the position of the storage object 8.

In this way, after the user 2 reaches the storage position and puts the storage object 8 in the storage position, the object storing and finding method can use the human sensor 111 of the corresponding lamp 11 to automatically detect the user 2 and trigger the Beacon host systems to send out the coordinate value to the mobile device 9, and then the user 2 can integrate the identification code 10 with the coordinate value by the mobile device 9 to perform the object storing operation and quickly, easily and accurately create the storage position information of the storage object 8. In the object finding operation, the user just needs to use the mobile device 9 to input the identification code 10 of the storage object 8 to be found, and then the lamp 11 of the corresponding storage position will show a luminous change to let the user 2 quickly know the storage position of the storage object 8. In this way, the warehouse access efficiency can be improved, and the lamp can be used as a "finding indicator" of the physical object".

Based on the aforementioned object storing and finding method and system, the luminous change can be a blinking expression or a color temperature change expression, and the obvious change can improve the effect of prompting the user 2. For example, when the user 2 is finding an object, after the user 2 inputs the identification code 10 through the mobile device 9, the user 2 can obtain the corresponding coordinate value, such that the lamp 10 shows a luminous change of blinking for several times or changing the original luminous color to another color.

In addition, if two or more lamps 11 are triggered by the human sensors 111 simultaneously to send out two or more coordinate values, the signal with the strongest intensity with the strongest intensity will be determined as the lamp where the mobile device is located. Therefore, the storage position corresponding to the coordinate value of the lamp 11 can be determined more accurately to avoid record errors that may lead to a less accurate object position in future object finding operations.

In addition, the identification code 10 and the coordinate value are stored in the mobile device 9 or cloud to facilitate the users to obtain the required information at any time. Preferably, the human sensor 111 is a pyro-electric infrared (PIR) detector or a microwave sensor which can accurately detect the user 2.

In summation of the description above, the object storing and finding method and system of the present disclosure uses the existing properties of the installed lamps of the indoor warehouse as a "finding indicator" of the physical objects. After the large-size objects are stored in a factory area, the specific position of each storage object can be known quickly in a future inquiry to facilitate the access operation of the storage objects in the factory area and improve the warehouse access efficiency. Further, the present disclosure also provides better choices for the luminous change of the lamp 11 or the type of the human sensor 111 and also provides a solution to reduce wrong storage records and ensure the accuracy of the object storing operation.

What is claimed is:

1. An object storing and finding method integrating a human sensor into a lamp, and working together with a mobile device to perform object storing and finding operations of at least one storage object in a storage environment, wherein the storage environment has a plurality of lamps, the object storing and finding method comprises:
    an object storing procedure, which includes setting an identification code, which is a QR code, on the storage object; installing a human sensor to each of the lamps; setting up a plurality of Beacon host systems in the storage environment to create a coordinate parameter table of the lamps in the storage environment; wherein when a user puts the storage object in a storage position of the storage environment, the human sensor of the lamp corresponding to the storage position will automatically detect the user to trigger the Beacon host systems to send out a coordinate value of the lamp corresponding to the storage position in the coordinate parameter table to be received and recorded by the mobile device, and through scanning and recording the identification code, the mobile device further combines the identification code with the coordinate value to complete the object storing operation; and
    an object finding procedure, that uses the mobile device to input the identification code of the storage object and then obtains the corresponding coordinate value, such that the lamp corresponding to the storage position of the storage object shows a luminous change for instructing the user to visually observe and determine the position of the storage object.

2. The object storing and finding method according to claim 1, wherein the human sensor is a pyro-electric infrared (PIR) detector or a microwave sensor.

3. The object storing and finding method according to claim 1, wherein the luminous change is a blinking expression or a color temperature change expression.

4. The object storing and finding method according to claim 3, wherein the human sensor is a pyro-electric infrared (PIR) detector or a microwave sensor.

5. The object storing and finding method according to claim 3, wherein if there are two or more lamps simultaneously triggering the human sensors to send out two or more coordinate values, signal with the strongest intensity will be determined as the lamp where the mobile device is located.

6. The object storing and finding method according to claim 5, wherein the human sensor is a pyro-electric infrared (PIR) detector or a microwave sensor.

7. The object storing and finding method according to claim 5, wherein the identification code and the coordinate value are stored in the mobile device or cloud.

8. The object storing and finding method according to claim 7, wherein the human sensor is a pyro-electric infrared (PIR) detector or a microwave sensor.

9. An object storing and finding system integrating a human sensor into a lamp, and working together with a mobile device to perform object storing and finding operations of at least one storage object in a storage environment, comprising:
    at least one identification code, installed and attached to the storage object;
    a plurality of lamps, installed in the storage environment, and each of the lamps having a human sensor; and
    a plurality of Beacon host systems, installed in the storage environment, and provided for creating a coordinate parameter table of the lamps in the storage environment; wherein when a user put the storage object in a storage position in the storage environment, the human sensor of the lamp corresponding to the storage position will automatically detect the user to trigger the Beacon host systems to send out a coordinate value of the lamp corresponding to the storage position in the coordinate parameter table to be received and stored by the mobile device, and through scanning and recording the identification code, the mobile device further combines the identification code with the coordinate value to complete the object storing operation; after the mobile device has inputted the identification code of the storage object, the corresponding coordinate value is obtained, and a luminous change of the lamp corresponding to the storage position of the storage object will be expressed to instruct the user to visually observe and determine the position of the storage object to complete the object finding operation.

10. The object storing and finding system according to claim 9, wherein the human sensor is a pyro-electric infrared (PIR) detector or a microwave sensor.

11. The object storing and finding system according to claim 9, wherein the luminous change is a blinking expression or a color temperature change expression.

12. The object storing and finding system according to claim 11, wherein the human sensor is a pyro-electric infrared (PIR) detector or a microwave sensor.

13. The object storing and finding system according to claim 11, wherein if there are two or more lamps simultaneously triggering the human sensors to send out two or more coordinate values, signal with the strongest intensity will be determined as the lamp where the mobile device is located.

14. The object storing and finding system according to claim 13, wherein the human sensor is a pyro-electric infrared (PIR) detector or a microwave sensor.

15. The object storing and finding system according to claim 13, wherein the identification code and the coordinate value are stored in the mobile device or cloud.

16. The object storing and finding system according to claim 15, wherein the human sensor is a pyro-electric infrared (PIR) detector or a microwave sensor.

* * * * *